(12) United States Patent
Hasegawa et al.

(10) Patent No.: US 7,545,437 B2
(45) Date of Patent: Jun. 9, 2009

(54) DIGITAL CAMERA FOR AN OPTICAL APPARATUS INCLUDING A COOLING MECHANISM FOR A SOLID-STATE IMAGING DEVICE

(75) Inventors: Kazuhiro Hasegawa, Hachioji (JP); Hideyuki Masuyama, Hachioji (JP); Yoshihiro Ue, Hidaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 670 days.

(21) Appl. No.: 10/305,910

(22) Filed: Nov. 27, 2002

(65) Prior Publication Data
US 2003/0117523 A1 Jun. 26, 2003

(30) Foreign Application Priority Data
Nov. 29, 2001 (JP) ............................. 2001-365018

(51) Int. Cl.
*H04N 5/225* (2006.01)
(52) U.S. Cl. ........................................ 348/374; 348/80
(58) Field of Classification Search ................ 348/374, 348/80
See application file for complete search history.

(56) References Cited

U.S. PATENT DOCUMENTS

| | | | | |
|---|---|---|---|---|
| 5,130,804 A | * | 7/1992 | Tamura et al. ............ 348/231.7 |
| 5,216,250 A | * | 6/1993 | Pellegrino et al. ....... 250/370.09 |
| 5,508,740 A | * | 4/1996 | Miyaguchi et al. ........... 348/244 |
| 6,236,430 B1 | * | 5/2001 | Suzuki et al. ............. 348/219.1 |
| 6,633,331 B1 | * | 10/2003 | Potter et al. ............. 348/207.11 |
| 2001/0055073 A1 | * | 12/2001 | Shinomiya ................... 348/374 |
| 2002/0044215 A1 | * | 4/2002 | Takagi et al. ................. 348/374 |
| 2002/0056804 A1 | * | 5/2002 | Konagaya ................. 250/208.1 |

FOREIGN PATENT DOCUMENTS

| | | |
|---|---|---|
| JP | 6-45570 A | 2/1994 |
| JP | 9-219867 A | 8/1997 |

* cited by examiner

*Primary Examiner*—Sinh N Tran
*Assistant Examiner*—Anthony J Daniels
(74) *Attorney, Agent, or Firm*—Frishauf, Holtz, Goodman & Chick, P.C.

(57) ABSTRACT

A digital camera for an optical apparatus according to an aspect of the present invention comprises a solid-state imaging device which picks up an image of a target object, a solid-state imaging device cooling part configured to cool the solid-state imaging device, and a sealing part which includes a printed board for wiring for electric signals, and seals the solid-state imaging device and the solid-state imaging device cooling part.

19 Claims, 3 Drawing Sheets

DIGITAL CAMERA FOR AN OPTICAL APPARATUS INCLUDING A COOLING MECHANISM FOR A SOLID-STATE IMAGING DEVICE

CROSS-REFERENCE TO RELATED APPLICATIONS

This application is based upon and claims the benefit of priority from the prior Japanese Patent Application No. 2001-365018, filed Nov. 29, 2001, the entire contents of which are incorporated herein by reference.

BACKGROUND OF THE INVENTION

1. Field of the Invention

The present invention relates to a digital camera for an optical apparatus, suitably used in an optical apparatus such as a microscope or the like.

2. Description of the Related Art

In microscopic observation, high-quality images have been demanded to perform pathologic diagnosis based on cellular forms, and fluorescent imaging to measure changes of samples based on very weak fluorescence, etc. In place of a conventional camera system using a silver film as an imaging device, a digital camera using a solid-state imaging device (hereinafter referred to as a "CCD device") has come to be used as means for acquiring an image.

In the CCD device, a dark current which is a very small output current flows even while light is not inputted. The dark current increases depending on increase in temperature and is added as a noise to image signals, as a result, the S/N ratio deteriorates. A method of cooling the CCD device to reduce the dark current has been adopted to improve the S/N ratio of image signals.

However, when a cooled CCD device is exposed to outer air having high humidity, dew condenses on the surface of the CCD device and moisture sticks to the surface. This degrades images or cause operational errors in peripheral devices. A sealed configuration has been adopted to avoid this problem. In the sealed configuration, the CCD device is configured in a sealed container having low humidity.

The following technique is known as a conventional sealed configuration (see Jpn. Pat. Appln. KOKAI Publication No. 6-45570).

Specifically, the sealed configuration is configured as follows. A cable, which has no air-permeability and uses a thin film material, is extended to the outside from between two halves into which one sealed container is divided. O-rings are inserted between the cable and the halves to fill gaps and to seal them.

However, in the sealed configuration described above, a special cable must be manufactured. This makes the cable expensive and difficult to acquire a large current capacity.

The CCD device described above also comprises light-receiving devices arrayed two-dimensionally. Resolution depends on the total number of light-receiving devices. If the CCD device is divided into a large number of devices to improve the resolution, however, sensitivity deteriorates and the apparatus becomes more expensive.

A means for acquiring an image signal with high image quality from a CCD device has already been disclosed (see Jpn. Pat. Appln. KOKAI Publication No. 9-219867). This is a technique which increases the number of pixels by moving two-dimensionally one CCD device having a small number of pixels, without degrading sensitivity.

In the technique described above, a plate-like metal member is bent, and a CCD device is assembled in a displacement mechanism using elastic force of the bent member. Further, improvements in number of pixels are achieved by moving two-dimensionally the CCD device by means of the displacement mechanism, without degrading sensitivity.

However, in this means for achieving high image quality of the CCD device, means for reducing the dark current of the CCD device is not proposed.

As has been described above, in the sealed configuration of a conventional CCD device, suffers it is necessary to manufacture the special cables and the substrate configuration is limited due to the current capacity. In addition, the conventional means for achieving high image quality of the CCD device can improve the resolution but increases the dark current, which causes deterioration of the S/N ratio.

BRIEF SUMMARY OF THE INVENTION

A digital camera for an optical apparatus according to an aspect of the present invention is characterized comprising: a solid-state imaging device which picks up an image of a target object; a solid-state imaging device cooling part configured to cool the solid-state imaging device; and a sealing part which includes a printed board for wiring for electric signals, and seals the solid-state imaging device and the solid-state imaging device cooling part.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and configure a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be explained in details with reference to the drawings.

Figure 1:
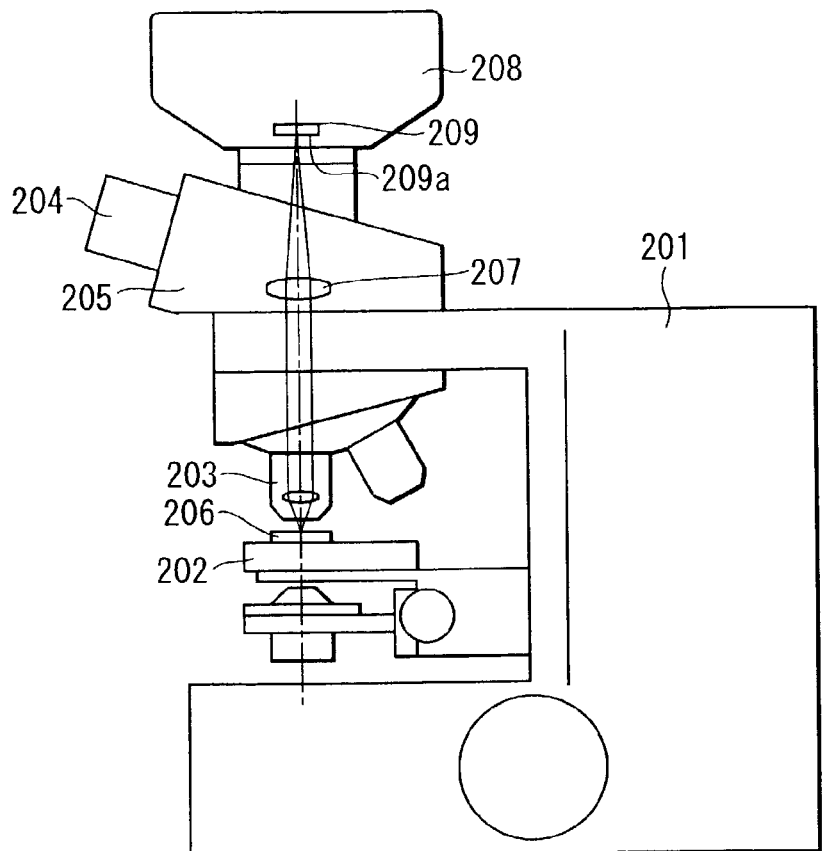
FIG. 1 shows a layout where a digital camera for an optical apparatus according to the first embodiment of the present invention is assembled in a microscope.

FIG. 1 is a view showing a microscope in which a digital camera for an optical apparatus according to the first embodiment of the present invention is mounted. A microscope main body 201 comprises a stage 202 capable of positioning a sample 206 such that the stage can move up and down along the optical axis direction. The microscope main body 201 also comprises an objective 203 and a mirror cylinder 205 positioned in combination with each other. The objective 203 is located opposite to the stage 202 and magnifies a sample image. The mirror cylinder 205 is equipped with an imaging lens 207 and an eyepiece lens 204 used for observation with eyes. A camera main body 208 which configures part of the digital camera for the optical apparatus is provided at the rear stage of the imaging lens 207.

To obtain a sample image in the structure described above, the sample 206 is set on the stage 202. The stage 202 is moved up and down to set the sample 206 at a focal point of the objective 203. It becomes possible to observe the magnified image of the sample through the imaging lens 207 and the eyepiece lens 204. At the same time, the magnified image of the sample is imaged on an imaging surface 209a of the CCD device (solid-state imaging device) in the camera main body 208 by the imaging lens 207, then an image signal is obtained.

Figure 2:
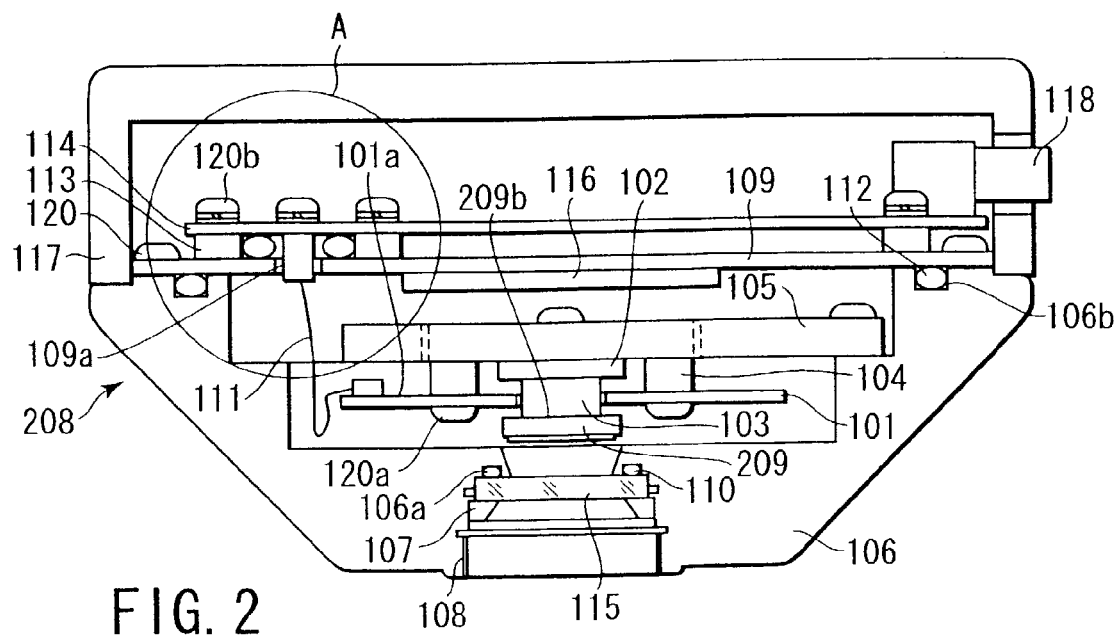
FIG. 2 is a structural view showing the digital camera for an optical apparatus according to the first embodiment of the present invention.

The camera main body 208 comprises a lower case 106 and an upper case 117 as shown in FIG. 2. The lower case 106 configures a part of a sealed container. A female screw part 108 used for assembling is provided in the lower case 106, corresponding to male screws not shown but provided for the mirror cylinder 205. The male screws of the mirror cylinder 205 are screwed in the female screw part 108, to assemble the lower case 106 in the microscope main body 201.

The CCD device 209 is mounted by soldering on a printed board 101 for the CCD device, which is contained in the camera main body 208. Further, a Peltier device 102 which transfers heat by applying the voltage thereto is thermally coupled with the rear surface 209b of the CCD device 209 through a thermally conductive elastic member 103 having high thermal conductivity. This Peltier device 102 is attached to and provided on the displacement member 105 described later. There is no particular limitation to the material or the like of the elastic member 103. For example, any material may be used for the elastic member 103 as long as the material has excellent thermal conductivity, like a rubber sheet with high thermal conductivity manufactured by Shin-Etsu Silicones (Shin-Etsu Chemical Co., Ltd.).

A spacer 104 is inserted between the displacement member 105 and the printed board 101 for the CCD device. The depth of the spacer 104 is set such that the height of the Peltier device 102 and the elastic member 103 with a high thermal conductivity is shorter than the total of the height from the rear surface 209b of the CCD device 209 to the installation surface 101a of the printed board 101 and the height of the spacer 104. Therefore, when the displacement member 105 and the printed board 101 are fixed by screws 120a, the printed board 101 is fixed to the displacement member 105 with the elastic member 103 deformed and contacting the Peltier device 102. Thereby, thermal resistance between each member is fixed in the low state. The displacement member 105 is fixed to the lower case 106 by screws.

A glass member 115 for taking in an image is fixed inside the female screw part 108 of the lower case 106 with a fixing member 107 inserted therebetween. To tighten the sealing between the glass member 115 and the lower case 106, a groove 106a, is formed opposite to one surface of the glass member 115. An O-ring 110 made of elastic rubber material is inserted in the groove 106a.

The wire diameter of the O-ring 110 is set 30% larger than the depth of the groove 106a. Once the O-ring 110 is set in the groove 106a, the ring is fixed deformed by one surface of the glass member 115. Then, small gaps can be eliminated, so that high sealing tightness can be obtained.

Figure 3:
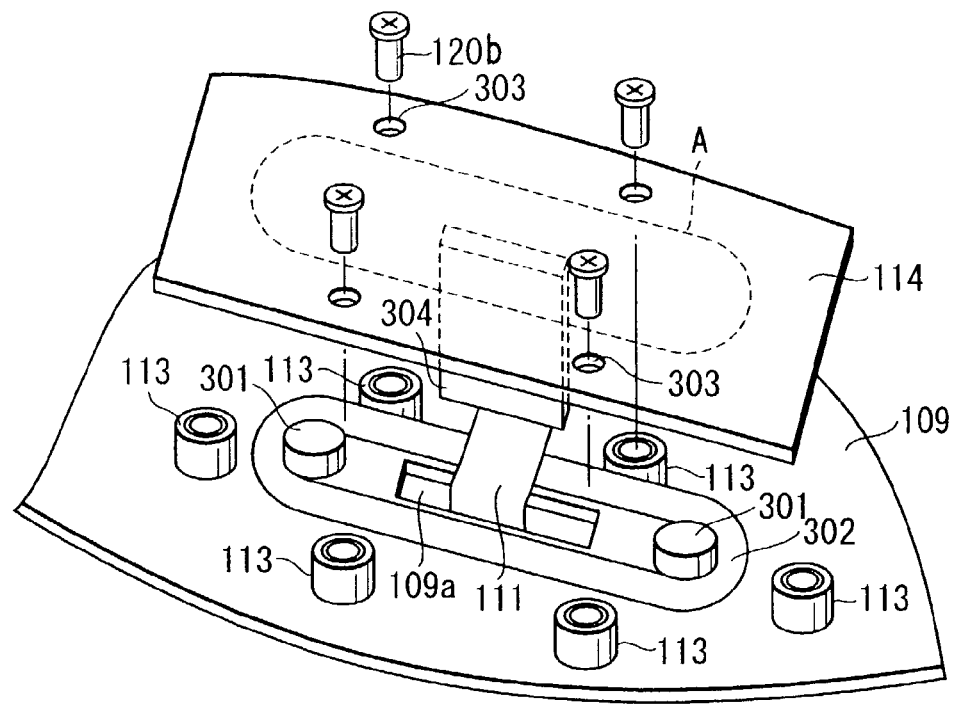
FIG. 3 is an enlarged explanatory view showing details of a main part of FIG. 2.

The lower case 106 is further provided with a groove 106b in the side opposite to the female screw part 108. An O-ring 112 is inserted in the groove 106b. An inner cover 109 is covered over the groove 106b. The depth of the groove 106b and the wire diameter of the O-ring 112 are set equal to those of the groove 106a, and the O-ring 110, respectively. The groove 106b and the O-ring 112 are also configured to provide desired sealing tightness, like the groove 106a, and the O-ring 110. FIG. 3 shows a state in which a cable 111 is connected to a board 114 through the inner cover 109. FIG. 3 is an enlarged and exploded perspective view showing the part A in FIG. 2.

The inner cover 109 comprises a rectangular slit 109a for inserting the cable, as shown in FIG. 3. Six fixing studs 113 for fixing the board and two positioning studs 301 for positioning an O-ring 302 are fixed by welding or the like at predetermined intervals around the slit 109a. The O-ring 302 is stretched around the two positioning studs 301.

The heights of the studs 113 and 301 and the wire diameter of the O-ring 302 are set in a relationship of: (the diameter of the O-ring 302)>(the height of each stud 113)>(the height of each stud 301). Therefore, if the printed board 114 used for control is fixed to the inner cover 109 by screws 120b, the O-ring 302 is deformed uniformly up to the height of each stud 113 throughout the whole circumference of the ring.

Figure 4:
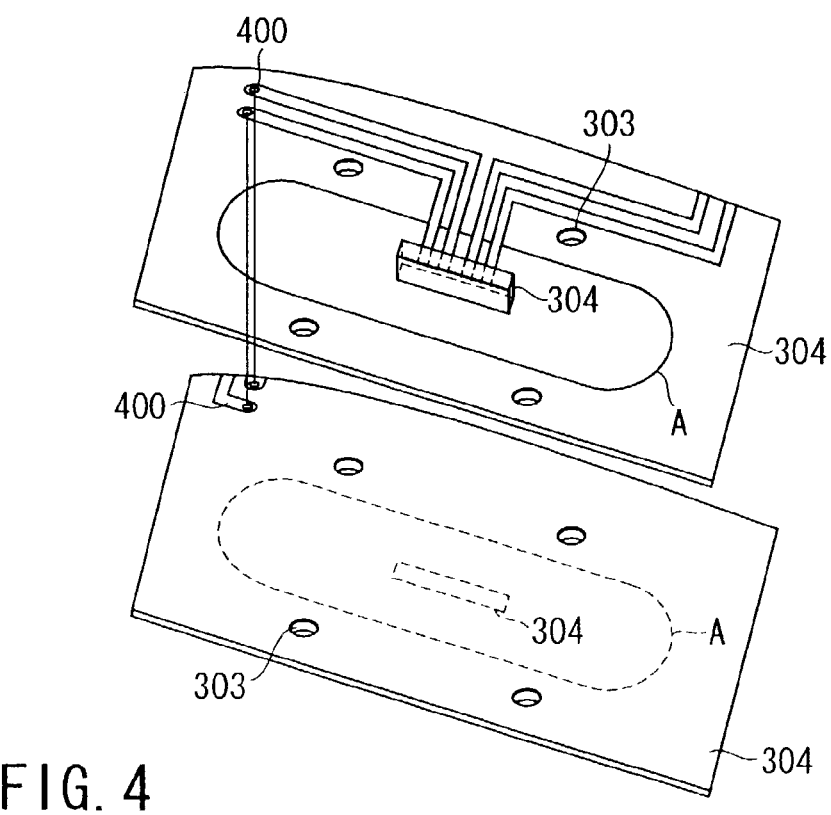
FIG. 4 is an explanatory view showing details of a printed board for control extracted from FIG. 2.

The printed board 114 for control is externally connected to a personal computer (not shown) through an external connecter 118. A connector 304 of a surface installation type is mounted on the inner side of the printed board 114 for control as shown in FIG. 4. Further, the connector 304 is electrically connected through the cable 111 to the printed board 101 for the CCD device.

Corresponding to the studs 113, screw holes 303 are formed in the printed board 114 for control, at portions (see FIG. 4) except the contact area contacting the O-ring 302 (which is the area surrounded by a broken line A in FIGS. 3 and 4 and will be referred to as only "broken line A"). The screws 120b are screwed into and fixed to the studs 113 through the screw holes 303.

More specifically, in addition to the screw holes 303, through holes for conducting respective layers of this multi-layered board are formed in the printed board 114 for control, outside the contact area (broken line A). The connector 304 used for the printed board 104 for control is of a surface installation type as has been explained previously. The contact area (broken line A) therefore includes no holes, resulting in substantially no air-permeability. Further, a resist film made of resin material is coated on the surface of the printed board 114 for control. Any hole which may penetrate the resist film therefore does not exist within the contact area (broken line A) used as a part of the sealed container, even if the board 114 is made of glass epoxy material which has air-permeability. Accordingly, the printed board 114 functions as a part of the sealed container and achieves a desired sealed configuration.

According to the structure as described above, the CCD device 209, Peltier device 102, and elastic member 103 with high thermal conductivity are sealed and shielded from the outer air by the lower case 106, glass member 115, inner cover 109, printed board 114 for control, and O-rings 110, 112, and 302, which configure the sealed container.

A predetermined amount of desiccant 116 such as silica gel is prepared on the inner surface of the inner cover 109 which configures a part of the sealed container. In the sealed container, the desiccant 116 eliminates moisture which has been taken in during any work or has entered from a slight gap. The inside of the sealed container is therefore maintained at low humidity. Dew is hence not condensed on the imaging surface 209a of the CCD device 209 regardless of influences from the outer humidity unless cooling is performed down to a temperature lower than a dew point depending on humidity in the sealed container.

In addition, a part of the sealed container is configured by the printed board 114 for control, which does not have through holes. Therefore, special components such as conventional flat cables need not be prepared to make an electric connection between the inside and outside of the sealed container. A large current capacity can be maintained accordingly, and various structures can be adopted.

Figure 5:
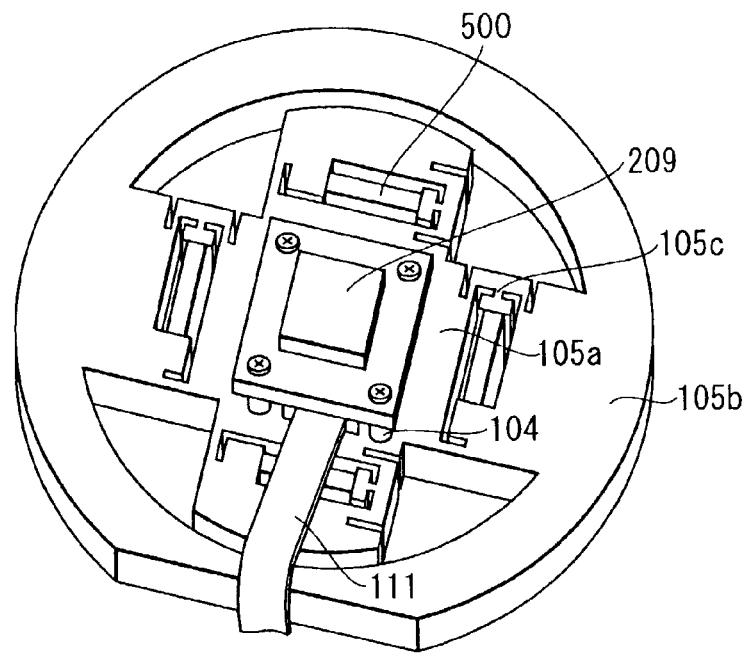
FIG. 5 is a detailed explanatory view showing a displacement member extracted from FIG. 2.

The displacement member 105 will now be explained. As shown in FIG. 5, the displacement member 105 comprises a displacement portion 105a, a fixed portion 105b, and a hinge portion 105c which connects the portions 105a and 105b. For example, these portions are formed integrally by a wire-cut process method. Piezoelectric devices 500 which configure a displacement means are bonded in two perpendicular directions between the displacement portion 105a and the fixed portion 105b.

Each piezoelectric device 500 displaces its own position in proportion to an applied voltage. By controlling the applied voltage by a control unit not shown, the displacement portion 105a of the displacement member 105 can be displaced by an arbitrary amount. The CCD device 209 supported by the displacement portion 105a is moved two-dimensionally and controlled in association with displacements of the piezoelectric devices 500.

The displacement member 105 is thermally coupled with and attached to the CCD device 209 and the high thermal conductive elastic member 103. The displacement member 105 therefore transmits heat moved by the Peltier device 102 to cool the CCD device 209. The heat transmitted through the displacement member 105 is further transmitted to the lower case 106 and finally radiated to the outer air. Thus, the displacement member 105 and the lower case 106 configure heat radiation routes of the Peltier device 102. As a result, since only few components are required and only mechanical couplings configure the heat radiation routes, the radiation routes which reduces low heat resistance can be realized.

Thus, the digital camera for an optical apparatus according to the present invention is configured such that the sealed container seals the CCD device 209 for picking up images and the Peltier device 102 configuring a part of a cooling means for cooling the CCD device 209. The printed board 114 for control configures a part of the sealed container.

According to this structure, connection to the outside can be made through the printed board 114 for control, which configures a part of the sealed container. It is hence unnecessary to use a conventional sealed configuration using the special cable as an external connector. The dark current can hence be reduced, and dew condensation can be prevented. Besides, it becomes possible to configure the substrate to which the limitation is not suffered by the current capacity.

In addition, the digital camera for an optical apparatus according to the present embodiment is structured as follow. The CCD device 209 and the displacement member 105 which support the CCD device 209 to be displaceable are configured through the Peltier device 102.

As a result, the heat which moves with the Peltier device 102 to cool the CCD device 209 is transmitted to the lower case 106 which configures the sealed container by displacement member 105 and is radiated. As a result, since it is unnecessary to newly provide the heat radiation route of the Peltier element 102, it becomes possible to reduce the load of the displacement member and reduce components.

Figure 6:
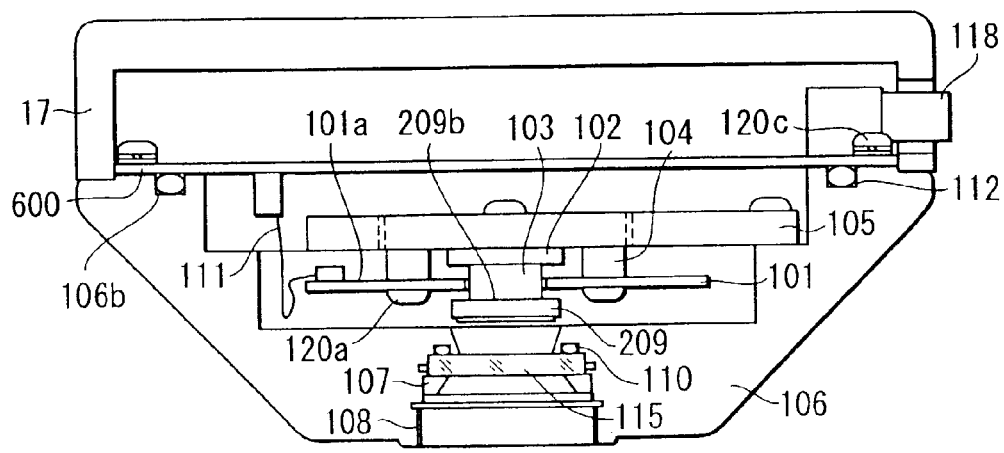
FIG. 6 is a structural view showing a main part of a digital camera for an optical apparatus according to the second embodiment of the present invention.

The first embodiment has been explained with reference to the case where a part of the sealed container is configured by the inner cover 109 and the printed board 114 for control. The present invention is not limited hitherto. As shown in FIG. 6, a printed board 600 for control may directly close the lower case, to configure a sealed container. FIG. 6 is a view showing the structure of a main part of a digital camera for an optical apparatus according to the second embodiment of the present invention. In FIG. 6, those components that are identical to the components in FIGS. 1 to 5 are denoted at identical reference symbols. Detailed explanation thereof will be omitted herefrom.

Specifically, an O-ring 112 is inserted in the groove 106b of the lower case 106. The printed board 600 for control is fixed over there with screws. As a result, roughness of the surface of the printed board 600 for control and small gaps of the lower case 106 are cleared like the first embodiment. A sealed configuration is thus configured.

According to the second embodiment, it is possible to omit the use of the inner cover 109 and O-ring 113. Connections between layers of the printed board 600 for control are not made by providing through holes which penetrate all the layers but are made in the following manner. For example, holes which penetrate only three layers are provided in case of a four-layered structure, and conductive members called "buried via(s)" are inserted in the holes, to provide conductivity between the three layers.

The above embodiments have been also explained with reference to the case where the present invention is applied to a microscope among various optical apparatuses. The present invention, however, is not limited hitherto but is applicable to other optical apparatuses. Though the Peltier device 102 is attached to the displacement member 105 in the above-mentioned embodiment, if the high resolution is not needed, the displacement member 105 may be replaced with a heat conduction member such as metal plate of aluminum or brass to transmit heat from the Peltier element 102 to the lower case 106.

The present invention is not limited to the embodiments described above. In practical phases, various modifications can be made without deriving from the subject matter of the invention. Further, the embodiments described above include inventions in various stages. Various inventions can therefore be extracted from appropriate combinations of the plural components and devices disclosed in the present specification.

A digital camera for an optical apparatus according to an aspect of the present invention is characterized comprising: a solid-state imaging device which picks up an image of a target object; a solid-state imaging device cooling part configured to cool the solid-state imaging device; and a sealing part which includes a printed board for wiring for electric signals, and seals the solid-state imaging device and the solid-state imaging device cooling part.

The following modes are preferable. The following modes may be adopted solely or with combining them.

(1) The printed board has a connector for an electric connection, a through hole, and an installation hole, the connector is attached to a part which functions as a cover part of the sealing part or attached to an opening part of the case, and the connector and the through hole are provided at positions other than a part which functions as the cover part of the sealing part or at positions other than the opening part of the case.

(2) The sealing part further comprises a case which covers the solid-state imaging device cooling part, and the printed board functions as a cover which seals an opening part of the case.

(3) Heat generated from the solid-state imaging device is radiated to outside through the elastic member with excellent thermal conductivity, the Peltier device, the thermal conductive member (displacement member), and the case.

(4) The solid-state imaging device cooling part has a Peltier device and a displacement member for displacing the solid-state imaging device.

(5) An elastic member with excellent thermal conductivity provided between the Peltier device and the solid-state imaging device.

(6) The case comprises an inner cover having an opening part through which a connector wire connected to a connector of the printed board penetrates, and the printed board seals the opening part of the inner cover.

According to the embodiments described above, external connections can be made to the outside from the printed board configures a part of a sealed container. It is therefore unnecessary to use such a sealed configuration using the special cable a connector for connection to the outside. The dark current can hence be reduced, and dew condensation can be prevented. Besides, it becomes possible to configure the substrate to which the limitation is not suffered by the current capacity.

In the embodiments described above, since the heat generated in the solid-state imaging device is radiated to outside by the solid imaging element cooling means through the displacement means, the resolution can be improved, and in addition, the reduction of the dark current of the solid imaging element becomes possible.

Also according to the embodiments described above, sealing means can be configured with a part thereof closed directly by the printed board. As a result, the number of used components can be reduced, so that simplification of assembling work can be promoted.

If several components are deleted from all the components disclosed in the embodiments, the structure from which the several components are deleted can be extracted as an invention as long as any object of the present invention described in the columns of the objects to be achieved by the invention is achieved and any advantage of the invention described in the columns of the advantages of the invention can be acquired.

For example, based on the foregoing embodiments, there can be provided a digital camera for an optical apparatus, comprising: an integrated displacement member including an elastic hinge for displacing a CCD device by a slight amount; a driving part configured to displace the displacement member by the slight amount; a cooling part configured to cool the CCD device; and a sealed container which shields a cooled section cooled by the cooling means, from outer air, wherein a part of the sealed container is configured by a printed board made of glass epoxy.

As has been specifically explained above, the present invention can provide a digital camera for an optical apparatus, which can efficiently and steadily cool an imaging device, configure without the limitation by the current capacity with a simple structure, and reduce generation of a dark current, so that improvements in image quality can be promoted.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An imaging apparatus mountable on an optical instrument, comprising:
    an imaging device to image an optical image;
    a two-dimensional drive mechanism including a base member and driving sections that are operable to cause two-dimensional displacement of the imaging device;
    a cooling device mounted on the base member and configured to cool the imaging device;
    a thermo-conductive member located between the imaging device and the cooling device;
    a sealing structure, which air-tightly seals a space around at least the imaging device and the two-dimensional drive mechanism, and which includes an exterior member, an optical member, an elastic member, and a circuit board; and
    a flexible cable which is provided inside the sealing structure and which couples the imaging device to the circuit board;
    wherein the circuit board does not have any holes extending therethrough at least in an area thereof corresponding to the sealing structure; and
    wherein the imaging device operates in synchronism with the two-dimensional displacement caused by the drive mechanism; and
    wherein the elastic member comprises a ring-shaped member which is more elastically deformable than the circuit board and which is provided between the exterior member and the area of the circuit board without holes.

2. The imaging device according to claim 1, wherein the cooling device comprises a Peltier device.

3. The imaging device according to claim 2, wherein the thermo-conductive member comprises a second elastic member with high thermal conductivity.

4. The imaging device according to claim 3, wherein heat generated from the imaging device is radiated to outside through the thermo-conductive member, the Peltier device, the two-dimensional drive mechanism, and the exterior member.

5. The imaging device according to claim 1, wherein a portion of the circuit board forms a part of the sealing structure such that a boundary of the sealed space is formed in part by the portion of the circuit board, and the circuit board does not have any holes extending therethrough in the portion thereof that forms a part of the sealing structure.

6. The imaging apparatus according to claim 1, further comprising a printed board for the imaging device, to which the imaging device is mounted;
    wherein the printed board is provided inside the sealing structure, and wherein the flexible cable is connected to the printed board.

7. An imaging apparatus mountable on an optical instrument, comprising:
    an imaging device to image an optical image;
    a two-dimensional drive mechanism including a base member and driving sections that are operable to cause two-dimensional displacement of the imaging device;
    a cooling device mounted on the base member and configured to cool the imaging device;
    a thermo-conductive member located between the imaging device and the cooling device;
    a sealing structure, which air-tightly seals a space around at least the imaging device, and which includes an exterior member, an optical member, an elastic member, and a circuit board; and a flexible cable which is provided inside the sealing structure and which couples the imaging device to the circuit board;

wherein a portion of the circuit board forms a part of the sealing structure such that a boundary of the sealed space is formed in part by the portion of the circuit board, and the circuit board does not have any holes extending therethrough at least in the portion thereof that forms a part of the sealing structure; and wherein the imaging device operates in synchronism with the two-dimensional displacement caused by the drive mechanism; and wherein the elastic member comprises a ring-shaped member which is more elastically deformable than the circuit board and which is provided between the exterior member and the portion of the circuit board without holes.

8. The imaging device according to claim 7, wherein the cooling device comprises a Peltier device.

9. The imaging device according to claim 8, wherein the thermo-conductive member comprises a second elastic member with high thermal conductivity.

10. The imaging device according to claim 9, wherein heat generated from the imaging device is radiated to outside through the thermo-conductive member, the Peltier device, the two-dimensional drive mechanism, and the exterior member.

11. The imaging apparatus according to claim 7, further comprising a printed board for the imaging device, to which the imaging device is mounted;

wherein the printed board is provided inside the sealing structure, and wherein the flexible cable is connected to the printed board.

12. A digital camera for an optical apparatus comprising:
a solid-state imaging device which picks up an image of a target object;
a solid-state imaging device cooling part configured to cool the solid-state imaging device; and
a printed board having wiring for electric signals, which forms a part of a sealing part which seals the solid-state imaging device and the solid-state imaging device cooling part;
wherein the printed board has a connector for an electric connection, a through hole, and an installation hole;
wherein the connector is attached to a part of the printed board which functions as a cover part of the sealing part; and
wherein the through hole and installation hole are provided at positions of the printed board other than the part which functions as the cover part of the sealing part.

13. The digital camera for an optical apparatus according to claim 12, wherein the solid-state imaging device cooling part comprises a Peltier device and a thermally conductive member.

14. The digital camera for an optical apparatus according to claim 13, further comprising an elastic member which has excellent thermal conductivity and is disposed between the Peltier device and the solid-state imaging device.

15. The digital camera for an optical apparatus according to claim 12, further comprising an inner cover having an opening part through which a connector wire connected to the connector of the printed board penetrates;
wherein the printed board seals the opening part of the inner cover.

16. The digital camera for an optical apparatus according to claim 12, wherein the sealing part further comprises an exterior member which covers the solid-state imaging device cooling part, and the printed board functions as a cover to seal an opening part of the exterior member.

17. The digital camera for an optical apparatus according to claim 16, wherein:
the solid-state imaging device cooling part comprises a Peltier device and a thermally conductive member;
the digital camera further comprises an elastic member which has excellent thermal conductivity and is disposed between the Peltier device and the solid-state imaging device; and
heat generated in the solid-state imaging device is released outside through the elastic member, the Peltier device, the thermally conductive member and the exterior member.

18. The digital camera for an optical apparatus according to claim 17, wherein the thermally conductive member is a displacement member.

19. The digital camera for an optical apparatus according to claim 16, wherein:
the connector of the printed board is provided on the printed board in the opening part of the exterior member; and
the through hole and the installation hole are provided at positions of the printed board away from the opening part of the exterior member.

* * * * *